US008364080B2

(12) United States Patent
Desai et al.

(10) Patent No.: US 8,364,080 B2
(45) Date of Patent: Jan. 29, 2013

(54) METHOD AND SYSTEM FOR ACHIEVING ENHANCED QUALITY AND HIGHER THROUGHPUT FOR COLLOCATED IEEE 802.11 B/G AND BLUETOOTH DEVICES IN COEXISTENT OPERATION

(75) Inventors: Prasanna Desai, Olivenhain, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 647 days.

(21) Appl. No.: 11/143,559

(22) Filed: Jun. 2, 2005

(65) Prior Publication Data

US 2006/0030266 A1 Feb. 9, 2006
US 2012/0034870 A9 Feb. 9, 2012

Related U.S. Application Data

(63) Continuation-in-part of application No. 10/387,249, filed on Mar. 12, 2003, now abandoned.

(60) Provisional application No. 60/600,394, filed on Aug. 9, 2004, provisional application No. 60/400,226, filed on Aug. 1, 2002.

(51) Int. Cl.
*H04B 7/00* (2006.01)
(52) U.S. Cl. ...................................... 455/41.2; 455/63.1
(58) Field of Classification Search ................ 455/41.2, 455/63.1, 67.11, 502, 552.1, 553.1
See application file for complete search history.

(56) References Cited

U.S. PATENT DOCUMENTS

| | | | |
|---|---|---|---|
| 6,763,483 B2 * | 7/2004 | Penick et al. | 714/39 |
| 7,072,616 B2 * | 7/2006 | Godfrey | 455/41.2 |
| 7,194,283 B2 * | 3/2007 | Kardach et al. | 455/552.1 |
| 2001/0010689 A1 * | 8/2001 | Awater et al. | 370/344 |
| 2004/0048577 A1 | 3/2004 | Godfrey et al. | |
| 2004/0116075 A1 * | 6/2004 | Shoemake et al. | 455/41.2 |
| 2005/0020299 A1 * | 1/2005 | Malone et al. | 455/552.1 |
| 2005/0059347 A1 * | 3/2005 | Haartsen | 455/41.2 |
| 2005/0215197 A1 * | 9/2005 | Chen et al. | 455/41.2 |
| 2005/0239451 A1 * | 10/2005 | Periyalwar et al. | 455/425 |

FOREIGN PATENT DOCUMENTS

| | | |
|---|---|---|
| CN | 1496020 | 5/2004 |
| EP | 1119137 A | 7/2001 |
| EP | 1389855 A | 2/2004 |

OTHER PUBLICATIONS

Nada Golmie, Nicolas Chevrollier and Olivier Rebala, *Bluetooth and WLAN Coexistence: Challenges and Solutions*, IEEE Wireless Communications, Dec. 2003, pp. 22-29.
Draft Recommended Practice for Information Technology-Telecommunications and Information Exchange Between Systems-Local and Metropolitan Area Networks Specific Requirements, Part 15.2: Coexistence of Wireless Personal Area Networks with Other Wireless Devices Operating in Unlicensed Frequency Bands, IEEE Standards Activities Department. Standard Licensing and Contracts, IEEE P802.15.2/Draft #05, Mar. 15, 2002, pp. 1-98.
Brian P. Crow, Indra Widjaja. Jeong Geun Kim, and Prescott T. Sakai, *IEEE 802.11 Wireless Local Area Networks*, IEEE Communications Magazine, Sep. 1997, pp. 116-126.

* cited by examiner

*Primary Examiner* — Ping Hsieh
(74) *Attorney, Agent, or Firm* — Thomas | Horstemeyer, LLP

(57) ABSTRACT

A method and system for achieving enhanced quality and higher throughput for collocated IEEE 802.11b/g and Bluetooth (BT) devices in coexistent operation are provided. A priority signal may be generated by a BT radio in a coexistence station to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration.

48 Claims, 12 Drawing Sheets

METHOD AND SYSTEM FOR ACHIEVING ENHANCED QUALITY AND HIGHER THROUGHPUT FOR COLLOCATED IEEE 802.11 B/G AND BLUETOOTH DEVICES IN COEXISTENT OPERATION

CROSS-REFERENCE TO RELATED APPLICATIONS/INCOROPRATION BY REFERENCE

This patent application makes reference to, claims priority to and claims benefit from U.S. Provisional Patent Application Ser. No. 60/600,394 filed on Aug. 9, 2004, and is a continuation-in-part of U.S. patent application Ser. No. 10/387,249 filed on Mar. 12, 2003 now abandoned, which makes reference to, claims priority to and claims the benefit from U.S. Provisional Patent Application Ser. No. 60/400,226 filed on Aug. 1, 2002.

This application makes reference to U.S. application Ser. No. 11/143,37 filed Jun. 2, 2005.

The above referenced applications are hereby incorporated herein by reference In their entirety.

FEDERALLY SPONSORED RESEARCH OR DEVELOPMENT

Not applicable.

MICROFICHE/COPYRIGHT REFERENCE

Not applicable.

FIELD OF INVENTION

Certain embodiments of the invention relate to interference in communication Systems. More specifically, certain embodiments of the invention relate to a method and systems for achieving enhanced quality and higher throughput for collocated IEEE 802.11b/g and Bluetooth devices in coexistent operation.

BACKGROUND OF THE INVENTION

The use of Wireless Personal Area Networks (WPANs) has been gaining popularity in a great number of applications because of the flexibility and convenience in connectivity they provide. WPAN systems, such as those based on Bluetooth (BT) technology, replace cumbersome cabling and/or wiring used to connect peripheral devices and/or mobile terminals by providing short distance wireless links that allow connectivity within a 10-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the isolation between the Bluetooth radio front-end and the WLAN radio front-end may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79 1 MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desense the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensed by the Bluetooth transmission as the isolation between radios is reduced. Due to high-volume, low-cost nature of WLAN and BT radio chips, the more expensive Surface Acoustic Wave (SAW) filtering devices that may filter out blocking signals from nearby channels are not generally utilized and collocated WLAN/Bluetooth radio device interference remains a concern in WPAN applications.

Other techniques may be based on collaborative coexistence mechanisms, such as those described in the IEEE 802.15.2-2002 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth radio device to determine whether Bluetooth communication is to occur. However, polling the Bluetooth radio device may have to be performed on a fairly constant basis and may detract the WLAN radio device from its own WLAN communication operations. If a polling window is utilized instead, where the polling window may be as long as several hundred microseconds, the WLAN radio device may not perform its WLAN protocol operations during that time with the expectation that the Bluetooth radio device may indicate that Bluetooth communication is to occur. In other instances, the collocated WLAN and Bluetooth radio devices may utilize an interrupt-driven arbitration approach. In this regard, considerable processing time may be necessary for performing the interrupt operation and to determine the appropriate communication schedule based on the priority and type of WLAN and Bluetooth packets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for achieving enhanced quality and higher throughput for collocated IEEE 802.11b/g and Bluetooth devices in coexistent operation, substantially as shown in and/or described in connection with at least one of the drawings, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for achieving enhanced quality and higher throughput for collocated IEEE 802.11b/g and Bluetooth (BT) devices in coexistent operation. A priority signal may be generated by a BT radio in a coexistence station to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration. This approach may provide an improvement in the performance of collocated WLAN and BT radio devices in coexistent operation.

Figure 1A:
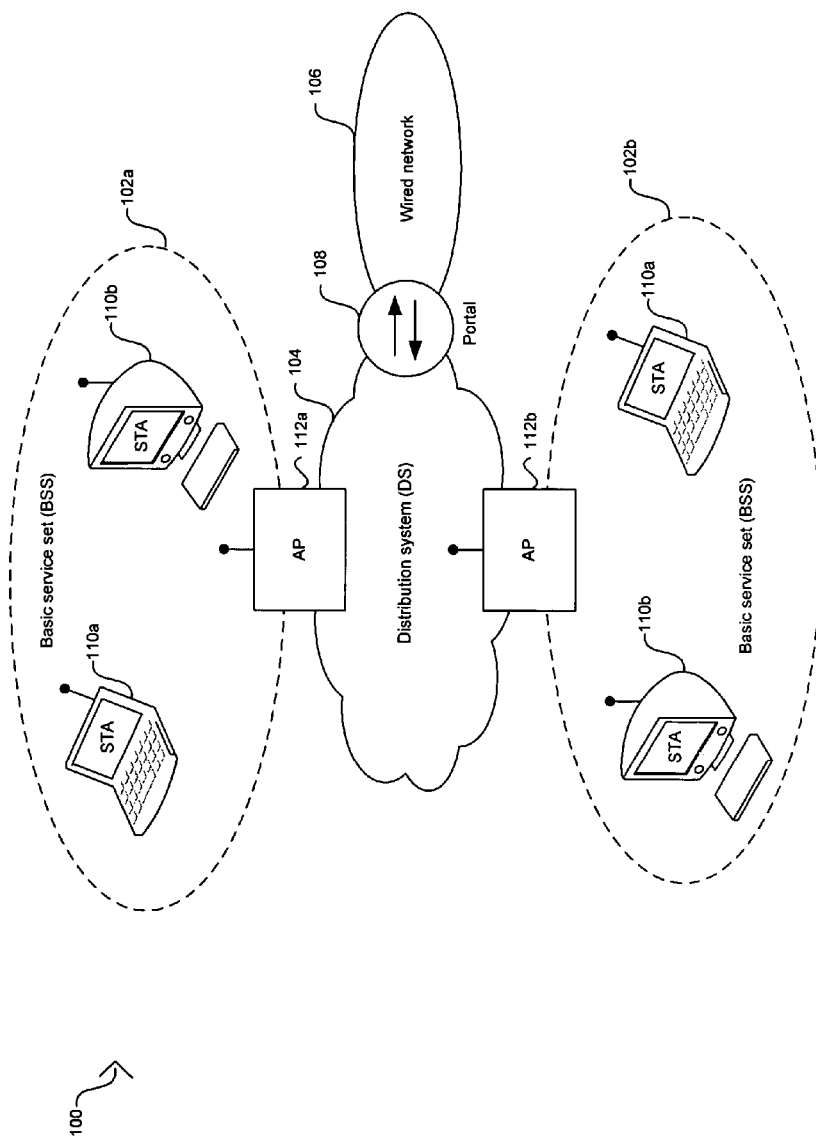
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
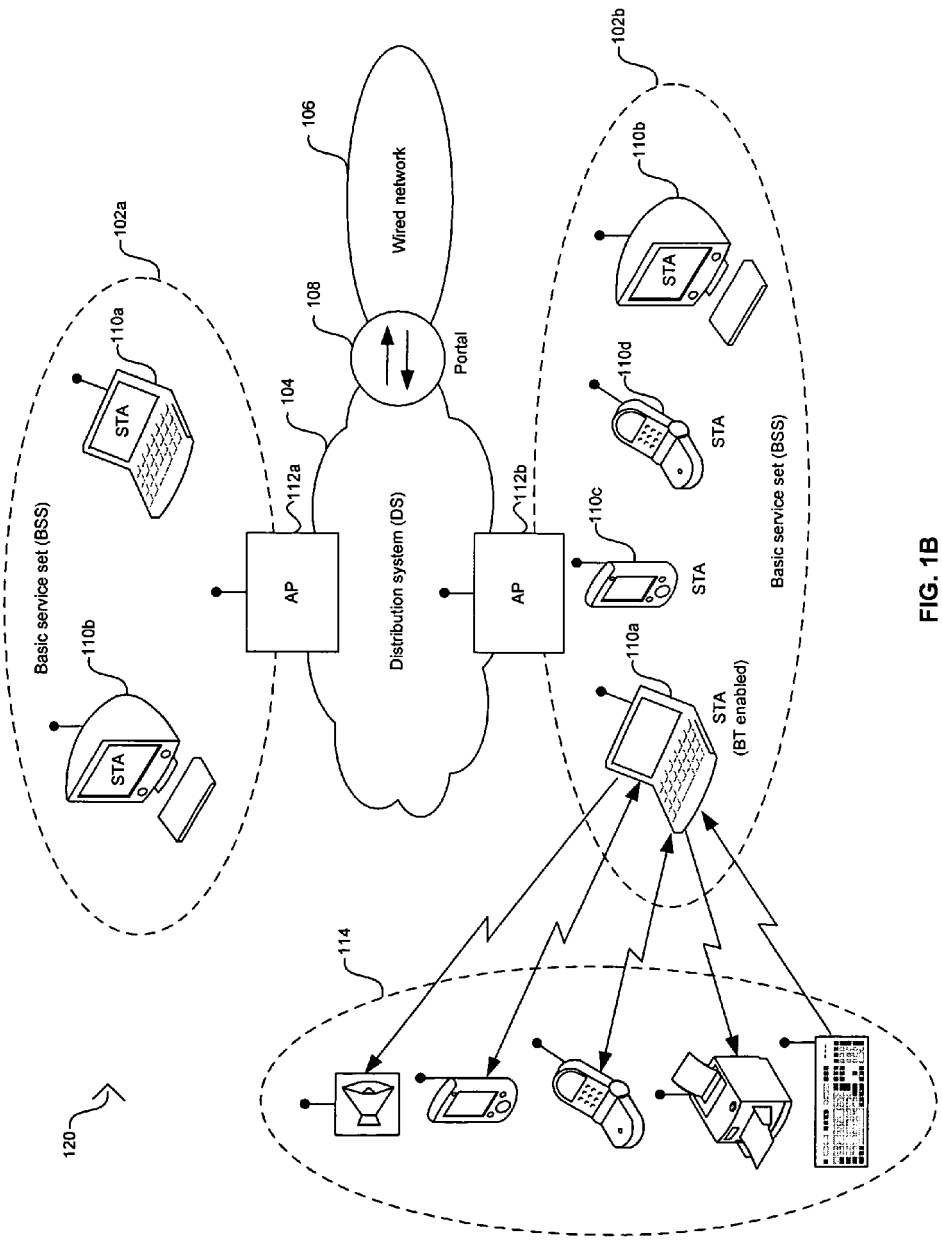
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising a basic service set (BSS) with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110a, locating the WLAN and BT radio devices in the same terminal may result in signal interference between WLAN and BT communications. When the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
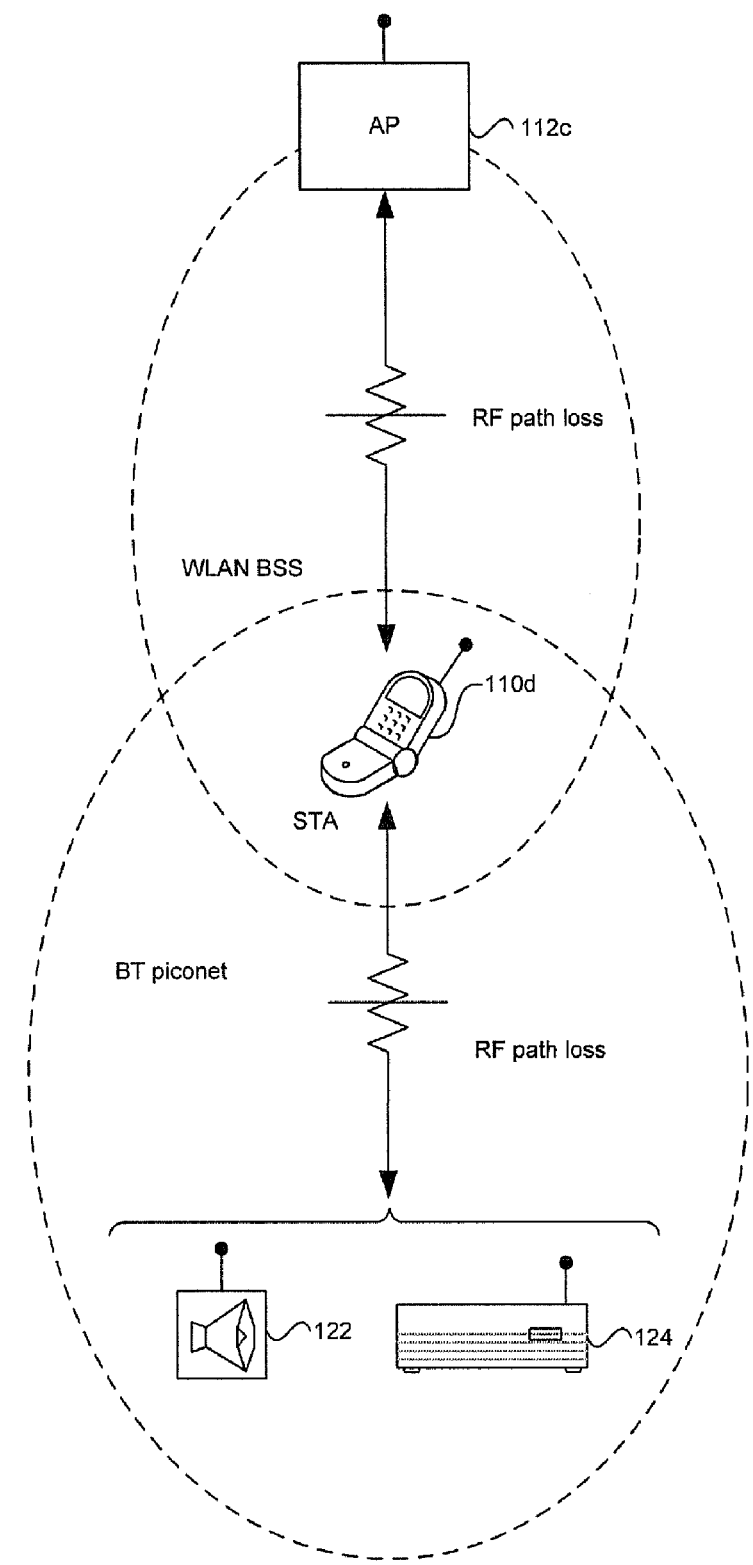
FIG. 1C is a block diagram that illustrates an exemplary usage model for a coexistence terminal with collocated WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the mobile phone 110d may comprise a WLAN radio device to communicate with an AP 112c. The RF path loss between the AP 112c and the mobile phone 110d may be, for example, 65 dB for 10 meters. The IEEE 802.15.2 draft, for example, provides a formula for calculating the RF path loss. The mobile phone 110d may also be Bluetooth-enabled and may comprise a Bluetooth radio device to communicate with, for example, a Bluetooth headset 122 and/or a home gateway 124 with Bluetooth cordless telephony capability. Because of the small form factor of the mobile phone 110d, the WLAN and Bluetooth radio devices may be in such close proximity to each other within the same coexistence terminal that the isolation between them is sufficiently low to allow desensitization of one radio device by the other.

The Bluetooth-enabled mobile phone 110d may comprise two transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth handset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112c and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110d which in turn may communicate the voice contents to other users through the WLAN infrastructure network.

Figure 2A:
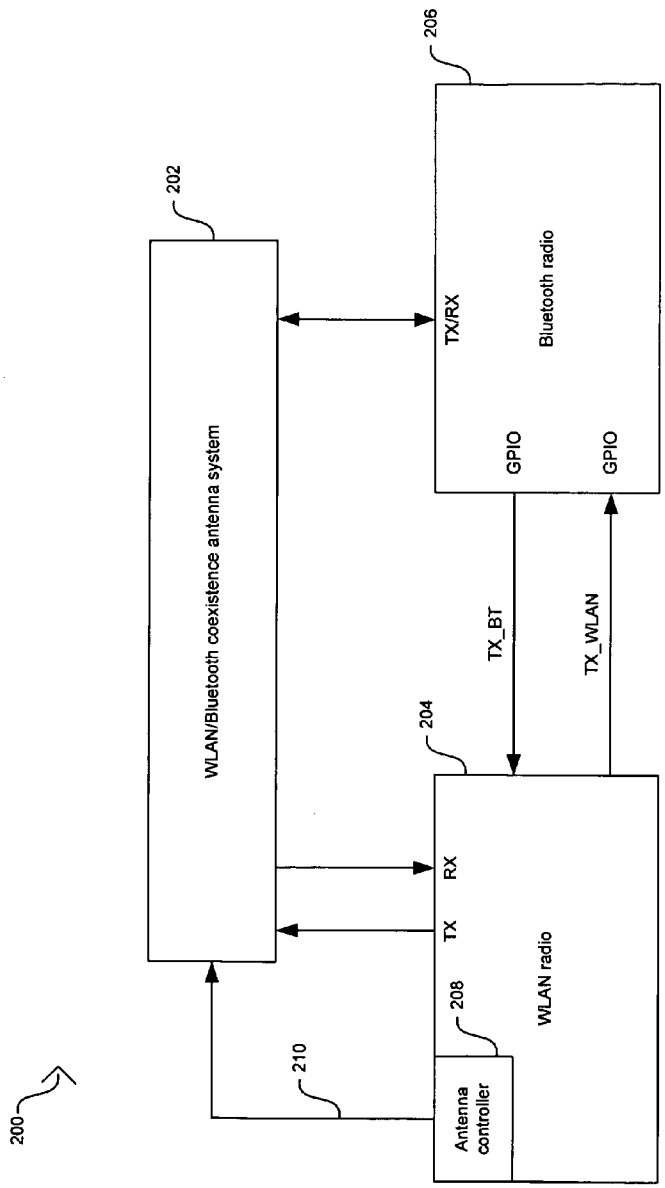
FIG. 2A is a block diagram of an exemplary WLAN/Bluetooth collaborative radio architecture with the WLAN device configuring the antenna system and the BT device having a single TX/RX port, in accordance with an embodiment of the invention.

FIG. 2A is a block diagram of an exemplary WLAN/Bluetooth collaborative radio architecture with the WLAN device configuring the antenna system and the Bluetooth device having a single TX/RX port, in accordance with an embodiment of the invention. Referring to FIG. 2A, the WLAN/Bluetooth collaborative radio architecture 200 may comprise a WLAN/Bluetooth coexistence antenna system 202, a WLAN radio device 204, and a Bluetooth radio device 206. The WLAN/Bluetooth coexistence antenna system 202 may comprise suitable hardware, logic, and/or circuitry that may be adapted to provide WLAN and Bluetooth communication between external devices and a coexistence terminal. The WLAN/Bluetooth coexistence antenna system 202 may comprise at least one antenna for the transmission and reception of WLAN and BT packet traffic. In this regard, the antenna or antennas utilized in the WLAN/Bluetooth coexistence antenna system 202 may be designed to meet the form factor requirements of the coexistence terminal.

The WLAN radio device 204 may comprise suitable logic, circuitry, and/or code that may be adapted to process WLAN protocol packets for communication. The WLAN radio device 204 may comprise an antenna controller 208 that may comprise suitable logic, circuitry, and/or code that may be adapted to generate at least one control signal 210 to configure the operation of the WLAN/Bluetooth coexistence antenna system 202. In this regard, the control signal 210 may be utilized to configure the WLAN/Bluetooth coexistence antenna system 202 for WLAN or Bluetooth communication. As shown, the WLAN radio device 204 may comprise separate ports for transmission (TX) and reception (RX) of WLAN packet traffic. However, a single TX/RX port may also be utilized for WLAN communication.

The WLAN radio device 204 may be adapted to generate a WLAN transmission (TX_WLAN) signal and to assert the TX_WLAN signal during WLAN communication. The WLAN radio device 204 may also be adapted to receive a Bluetooth priority (TX_BT) signal from the Bluetooth radio device 206. When the Bluetooth radio device 206 asserts the TX_BT signal, the transmission of WLAN traffic from the WLAN radio device 204 may be disabled. No polling or interrupt-driven mechanism need be utilized. In this regard, disabling the transmission path in the WLAN radio device 204 may be performed by, for example, utilizing a general purpose input/output (GPIO) pin. This approach may be similar to disabling a WLAN device in airplanes so that passengers may be sure the radios in their portable devices are turned off and cannot interfere with the airplane's systems. When the Bluetooth radio device 206 deasserts the TX_BT signal, the transmission of WLAN traffic from the WLAN radio device 204 may be enabled. Firmware operating in the WLAN radio device 204 may track the traffic status when WLAN transmission is disabled and may utilize the traffic status to resume communications once WLAN transmission is enabled.

The Bluetooth radio device 206 may comprise suitable logic, circuitry, and/or code that may be adapted to process Bluetooth protocol packets for communication. As shown, the Bluetooth radio device 206 may comprise a single port for transmission and reception (TX/RX) of Bluetooth packet traffic. The Bluetooth radio device 206 may be adapted to generate the TX_BT signal and to assert the signal when Bluetooth frames are available for communication. The TX_BT signal may be transferred to the WLAN radio device via a GPIO pin in the Bluetooth radio device 206. The Bluetooth radio device 206 may also be adapted to deassert the TX_BT signal when communication of the Bluetooth frames has been completed.

In some instances, either the WLAN radio device 204 or the Bluetooth radio device 206 may be disabled and the wireless terminal may not operate in a coexistence mode. When the WLAN radio device 204 is disabled, the WLAN/Bluetooth coexistence antenna system 202 may utilize a default configuration to support Bluetooth communication. When the Bluetooth radio device 206 is disabled, the antenna controller 208 may configure the WLAN/Bluetooth coexistence antenna system 202 to support WLAN communication.

Figure 2B:
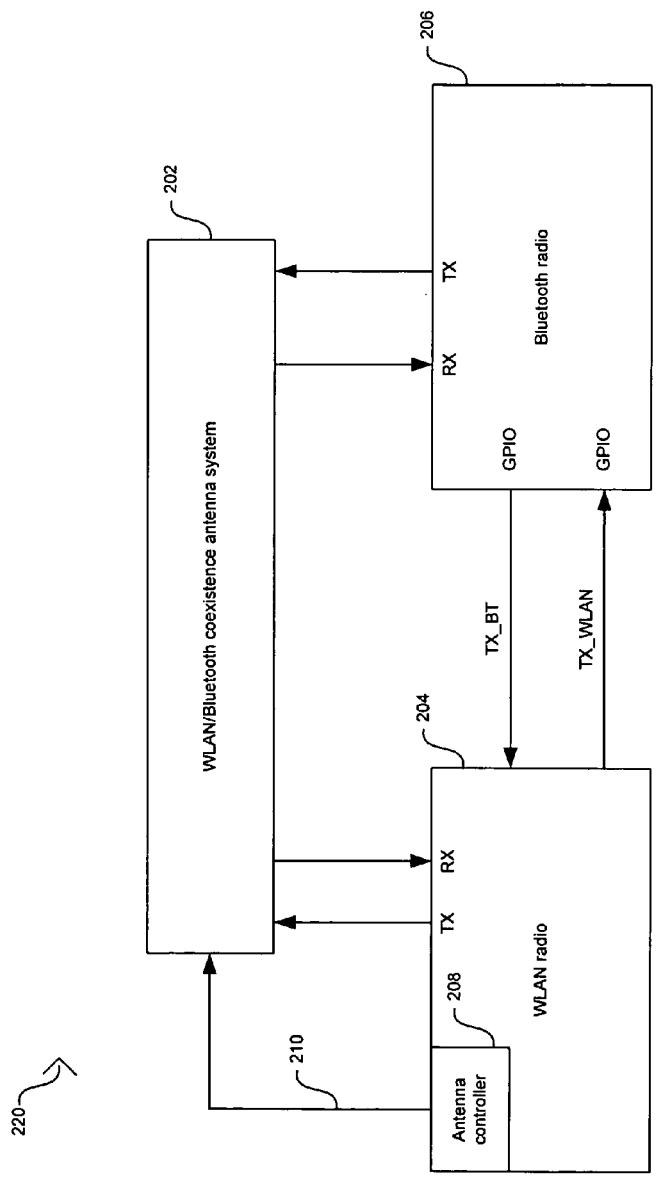
FIG. 2B is a block diagram of an exemplary WLAN/Bluetooth collaborative radio architecture with the WLAN device configuring the antenna system and the BT device having separate TX and RX ports, in accordance with an embodiment of the invention.

FIG. 2B is a block diagram of an exemplary WLAN/Bluetooth collaborative radio architecture with the WLAN device configuring the antenna system and the Bluetooth device having separate TX and RX ports, in accordance with an embodiment of the invention. Referring to FIG. 2B, the WLAN/Bluetooth collaborative radio architecture 220 may comprise the WLAN/Bluetooth coexistence antenna system 202, the WLAN radio device 204, and the Bluetooth radio device 206. In this regard, the Bluetooth radio device 206 in FIG. 2B comprises separate transmission (TX) and reception (RX) ports for Bluetooth communication. The antenna controller 208 and the control signal 210 may be adapted to configure the WLAN/Bluetooth coexistence antenna system 202 to accommodate for the separate TX and RX ports in the Bluetooth radio device 206.

In some instances, either the WLAN radio device 204 or the Bluetooth radio device 206 may be disabled and the wireless terminal may not operate in a coexistence mode. When the WLAN radio device 204 is disabled, the WLAN/Bluetooth coexistence antenna system 202 may utilize a default configuration to support Bluetooth communication. When the Bluetooth radio device 206 is disabled, the antenna controller 208 may configure the WLAN/Bluetooth coexistence antenna system 202 to support WLAN communication.

Figure 2C:
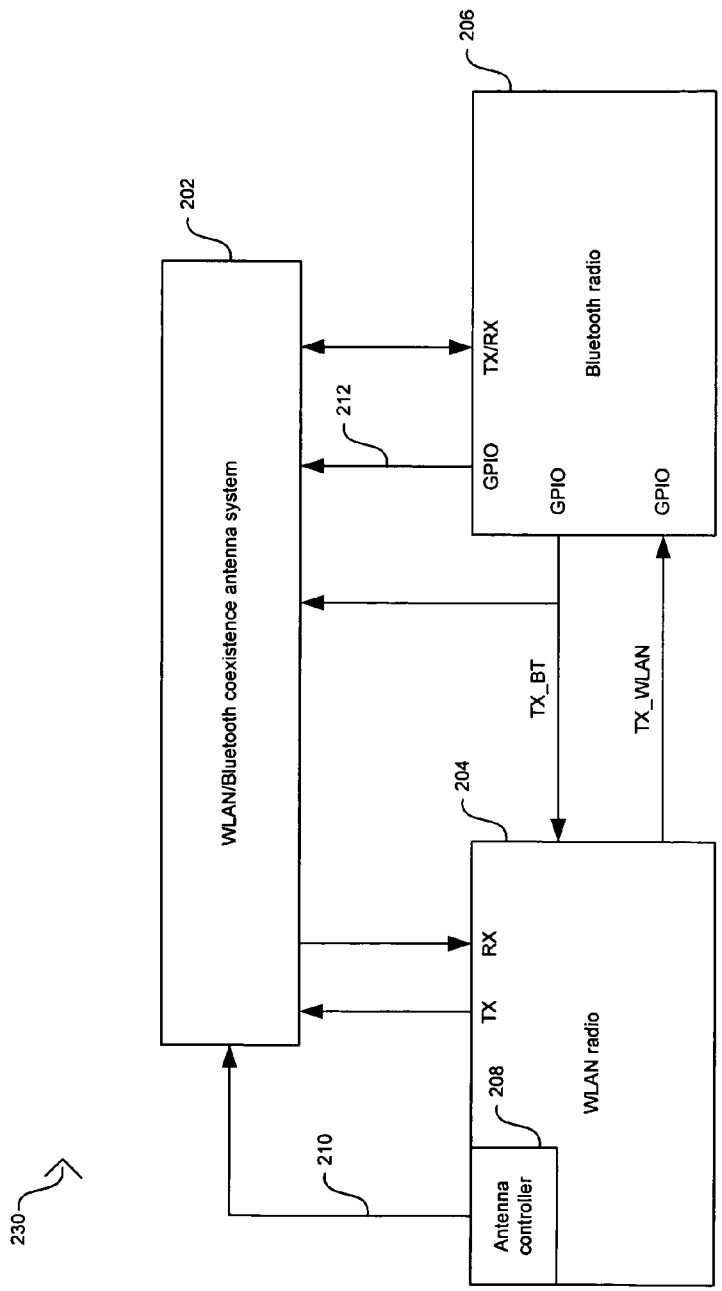
FIG. 2C is a block diagram of an exemplary WLAN/Bluetooth collaborative architecture with both radio devices configuring the antenna system and the Bluetooth radio device having a single TX/RX port, in accordance with an embodiment of the invention.

FIG. 2C is a block diagram of an exemplary WLAN/Bluetooth collaborative architecture with both radio devices configuring the antenna system and the Bluetooth radio device having a single TX/RX port, in accordance with an embodiment of the invention. Referring to FIG. 2C, the WLAN/Bluetooth collaborative radio architecture 230 may comprise the WLAN/Bluetooth coexistence antenna system 202, the WLAN radio device 204, and the Bluetooth radio device 206. The Bluetooth radio device 206 may be adapted to generate a configuration signal 212 to indicate different priority conditions that may be associated with different types of Bluetooth packets. The configuration signal 212 may be transferred to the WLAN/Bluetooth coexistence antenna system 202 via a GPIO pin in the Bluetooth radio device 206. In this regard, the configuration signal 212 may be at least 1-bit wide in order to provide higher granularity or priority selection during coexistence operation. The TX_BT and/or the configuration signal 212 may be utilized with and/or instead of the control signal 210 to configure the WLAN/Bluetooth coexistence antenna system 202.

In some instances, either the WLAN radio device 204 or the Bluetooth radio device 206 may be disabled and the wireless terminal may not operate in a coexistence mode. When the WLAN radio device 204 is disabled, the Bluetooth radio 206 may configure the WLAN/Bluetooth coexistence antenna system 202 via the configuration signal 212 to support Bluetooth communication. When the Bluetooth radio device 206 is disabled, the antenna controller 208 may configure the WLAN/Bluetooth coexistence antenna system 202 to support WLAN communication.

Figure 2D:
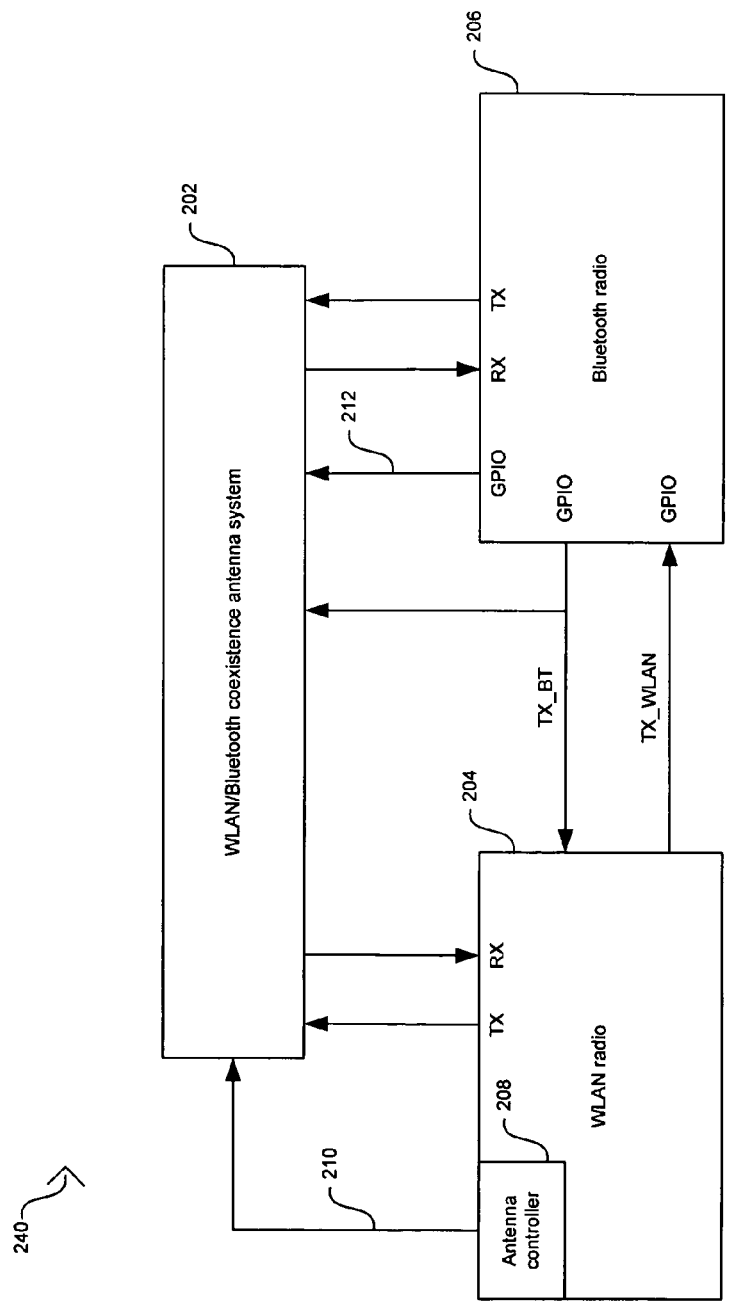
FIG. 2D is a block diagram of an exemplary WLAN/Bluetooth collaborative architecture with both radio devices configuring the antenna system and the Bluetooth radio device having separate TX and RX ports, in accordance with an embodiment of the invention.

FIG. 2D is a block diagram of an exemplary WLAN/Bluetooth collaborative architecture with both radio devices configuring the antenna system and the Bluetooth radio device having separate TX and RX ports, in accordance with an embodiment of the invention. Referring to FIG. 2D, the WLAN/Bluetooth collaborative radio architecture 240 may comprise the WLAN/Bluetooth coexistence antenna system 202, the WLAN radio device 204, and the Bluetooth radio device 206. The Bluetooth radio device 206 may comprise separate transmission (TX) and reception (RX) ports for Bluetooth communication. In this regard, the configuration signal 212 may be utilized to configure the WLAN/Bluetooth coexistence antenna system 202 to support separate TX and RX ports for Bluetooth communication. The TX_BT and the configuration signal 212 may be utilized with or instead of the control signal 210 to configure the WLAN/Bluetooth coexistence antenna system 202 and to accommodate for the separate TX and RX ports in the Bluetooth radio device 206.

In some instances, either the WLAN radio device 204 or the Bluetooth radio device 206 may be disabled and the wireless terminal may not operate in a coexistence mode. When the WLAN radio device 204 is disabled, the Bluetooth radio 206 may configure the WLAN/Bluetooth coexistence antenna system 202 via the configuration signal 212 to support Bluetooth communication. When the Bluetooth radio device 206 is disabled, the antenna controller 208 may configure the WLAN/Bluetooth coexistence antenna system 202 to support WLAN communication.

Figure 3:
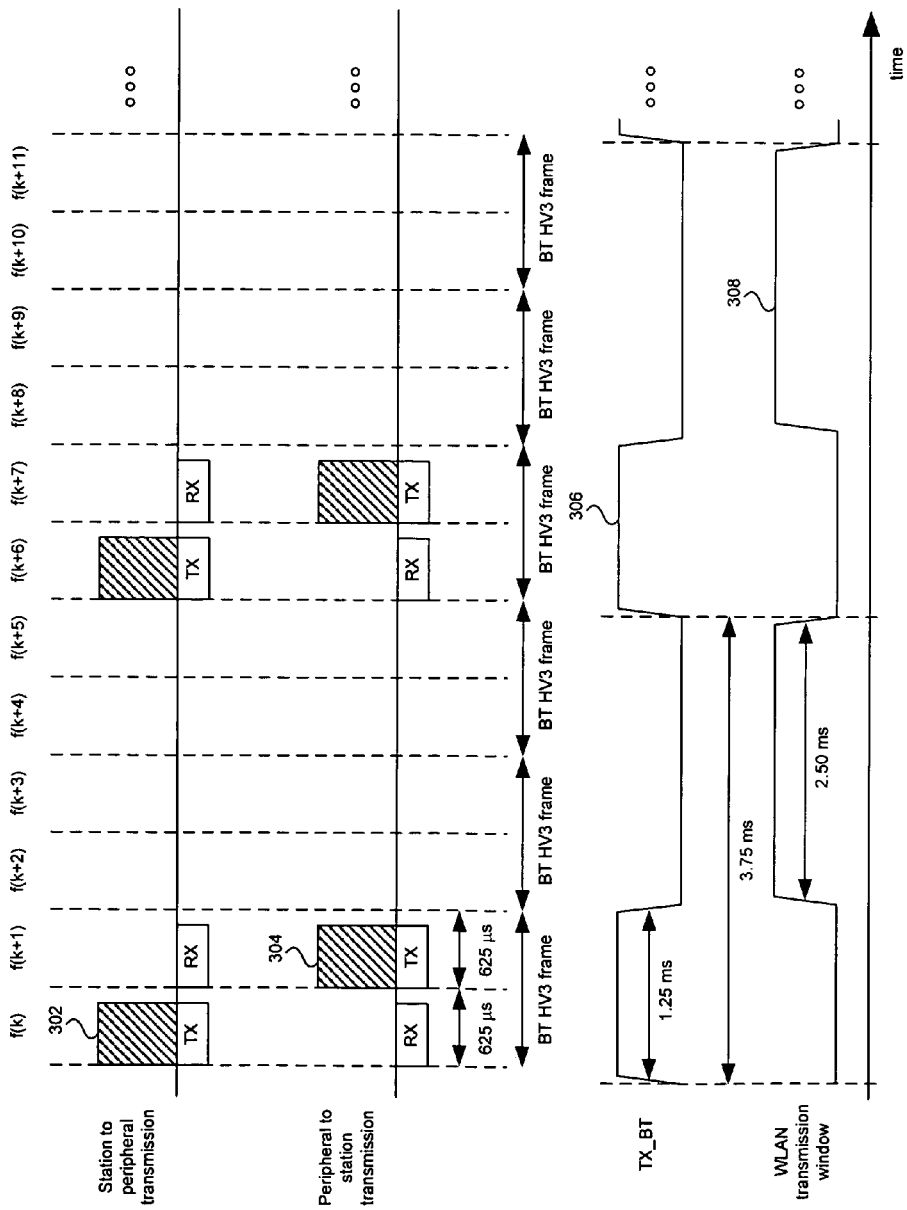
FIG. 3 is a timing diagram that illustrates an exemplary communication of BT HV3 frames and WLAN transmissions based on the TX_BT signal, in accordance with an embodiment of the invention.

FIG. 3 is a timing diagram that illustrates an exemplary communication of BT HV3 frames and WLAN transmissions based on the TX_BT signal, in accordance with an embodiment of the invention. Referring to FIG. 3, the Bluetooth radio device 206 may be adapted to communicate Bluetooth packets supported by the synchronous connection-oriented (SCO) logical transport. In this regard, the Bluetooth radio device 206 may be adapted to communicate Bluetooth (BT) HV3 packets. A BT HV3 packet may be generally used for 64 kb/s speech transmission but need not be so limited. The BT HV3 packet may comprise 30 information bytes with a payload length of 240 bits and no payload header present. The bytes are not protected by forward error correction (FEC) and no cyclic redundancy check (CRC) is present. Because retransmission of BT HV3 packets is not supported, when a BT HV3 packet is not received, the quality of the overall transmission is reduced since the information contained in the lost BT HV3 packet will not be retransmitted. As a result, BT HV3 packets may require a higher priority of transmission to avoid interference with WLAN transmission.

Referring back to FIG. 3, there is shown an exemplary timing representation of BT HV 3 communication from a coexistence terminal. The transmission of a pair of BT HV3 packets between a station or terminal and a peripheral device is referred to as a BT HV3 frame. A packet 302 may be transmitted from the station to the peripheral device in time slot f(k) and a packet 304 may be transmitted from the peripheral device to the station in time slot f(k+1). A time slot in Bluetooth communication is 625 μs in duration and each time slot may correspond to a different frequency in an adaptive frequency hopping (AFH) hopping sequence. A BT HV3 frame is 1.25 ms in duration. Transmission of BT HV3 packets from the coexistence terminal may occur every sixth time slot or every third BT HV3 frame. For example, a first packet may be transmitted from the station during time slot f(k) and a next packet may be transmitted from the station during time slot f(k+6). Similarly, a first packet may be received by the station during time slot f(k+1) and a next packet may be received by the station during time slot f(k+7). As a result, no Bluetooth transmission may occur over a period of two BT HV3 frames providing a WLAN transmission window of 2.5 ms.

As shown, the TX_BT signal 306 may be asserted during time slots f(k) and f(k+1) and during time slots f(k+6) and f(k+7) to provide priority transmission to the BT HV3 packets over WLAN transmission. Asserting the TX_BT signal 306 may disable WLAN transmissions in the WLAN radio device 204, for example. The WLAN transmission window 308 illustrates a period of time between assertions of the TX_BT signal 306 when the WLAN radio device 204 may transmit WLAN packets. In this example, the WLAN radio device 204 may transmit WLAN packets during time slots f(k+2) through f(k+5) and during time slots f(k+8) through f(k+11).

Figure 4:
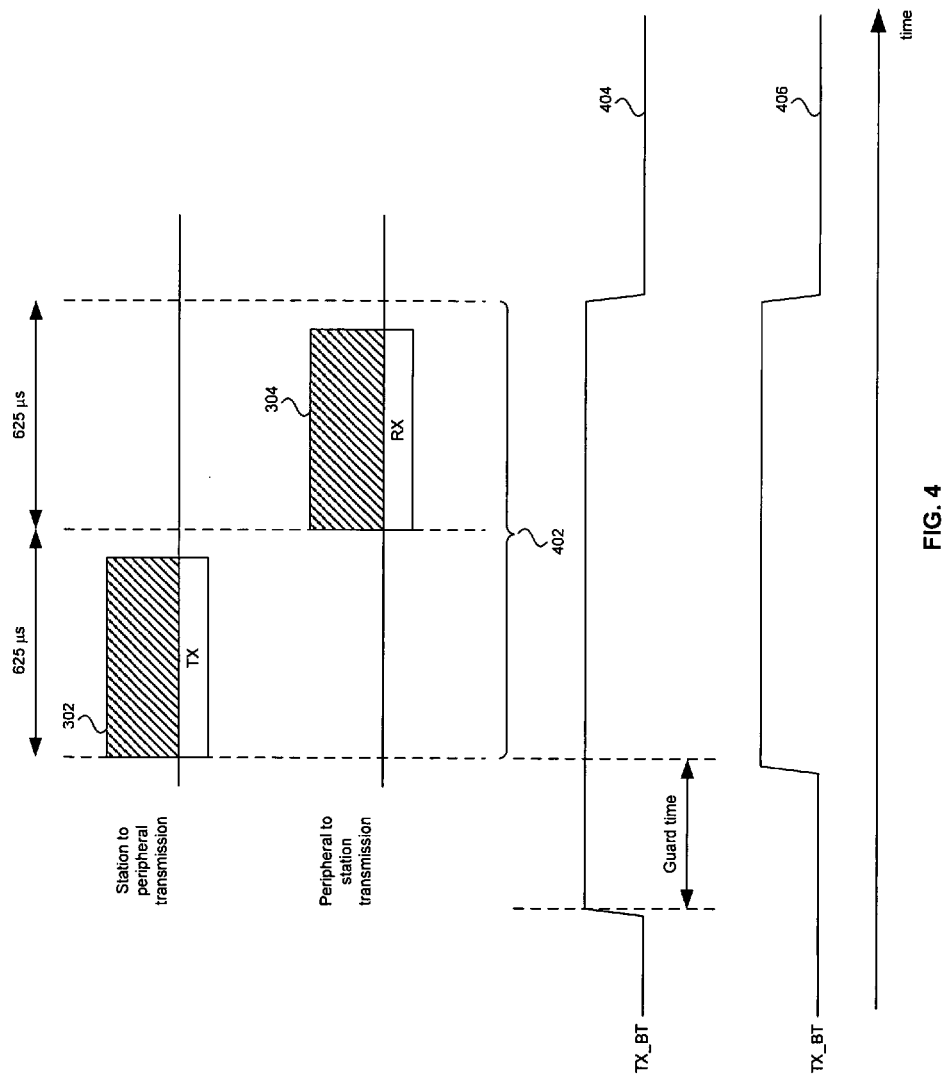
FIG. 4 is a timing diagram that illustrates exemplary assertion instances of the TX_BT signal, in accordance with an embodiment of the invention.

FIG. 4 is a timing diagram that illustrates exemplary assertion instances of the TX_BT signal, in accordance with an embodiment of the invention. Referring to FIG. 4, there is shown a BT HV3 frame 402, a first TX_BT signal 404, and a second TX_BT signal 406. The first TX_BT signal 404 may be asserted prior to the start of the BT HV3 frame 402 in order to provide firmware and/or hardware in the WLAN radio device 204 with time to complete or terminate a current WLAN packet transmission. The first TX_BT signal 404 may be asserted within a guard time. This guard time may range from just prior to the start of the BT HV3 frame 402 to 200 μs to 250 μs prior to the start of the BT HV3 frame 402. In this regard, firmware and/or hardware in the WLAN radio device 204 may generate and/or store information regarding the completion or termination of the current WLAN packet transmission. The WLAN radio device 204 may utilize the information generated and/or stored to resume WLAN packet communications after the first BT_TX signal 404 is deasserted.

In another embodiment of the assertion operation, the second TX_BT signal 406 may be asserted immediately prior to the start of the BT HV3 frame 402 in order to terminate a current WLAN packet transmission by the WLAN radio device 204. This approach may be utilized when, for example, the second TX_BT signal 406 may be asserted on a pin that turns OFF a power amplifier utilized for supporting WLAN packet transmissions in the WLAN radio device 204. In this regard, firmware and/or hardware in the WLAN radio device 204 may generate and/or store information regarding the termination of the current WLAN packet transmission. The WLAN radio device 204 may utilize the information generated and/or stored to resume WLAN packet communications after the second BT_TX signal 406 is deasserted.

Figure 5A:
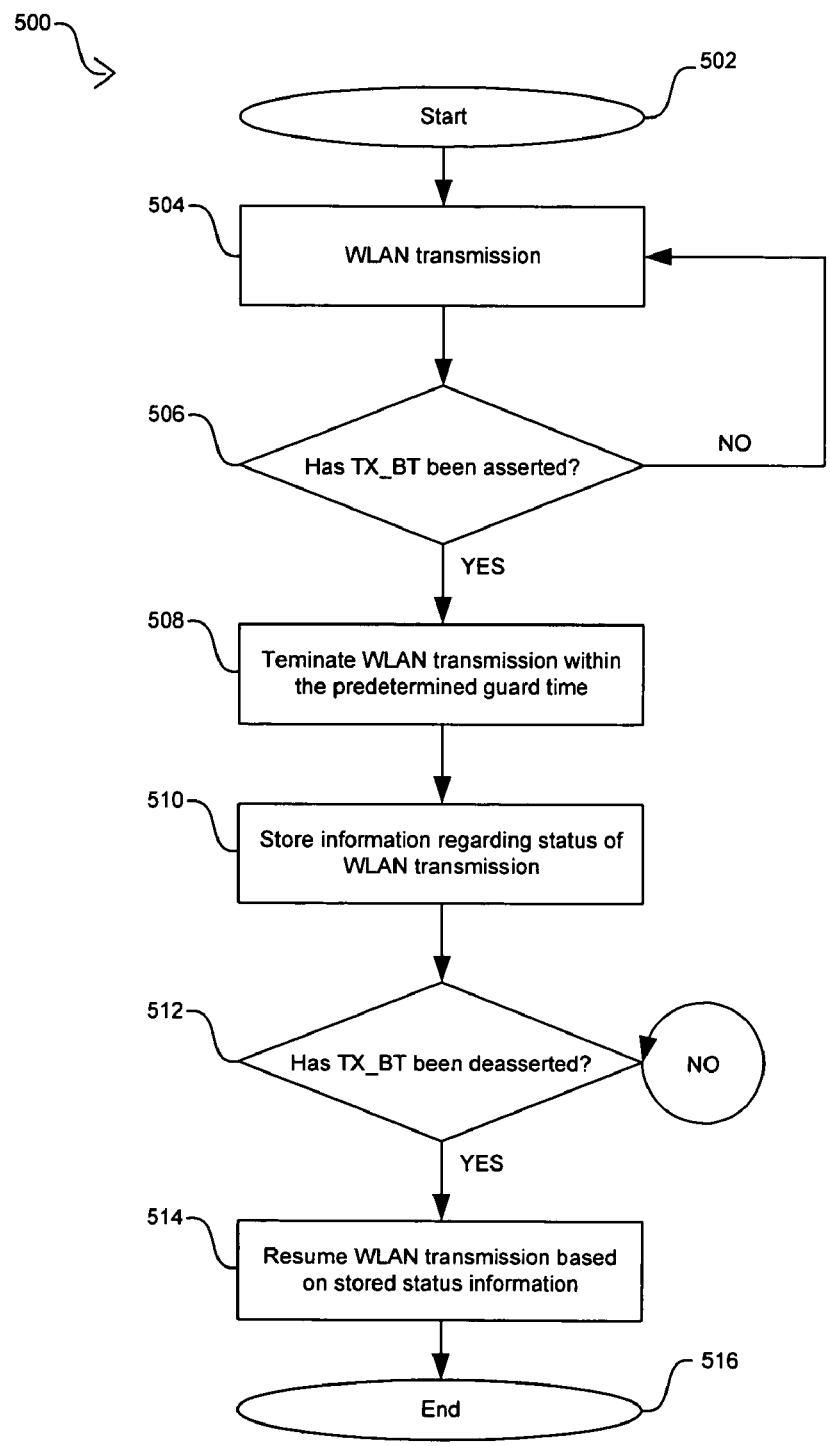
FIG. 5A is a flow diagram that illustrates exemplary steps for priority communication of BT HV3 traffic when utilizing a predetermined guard time, in accordance with an embodiment of the invention.

FIG. 5A is a flow diagram that illustrates exemplary steps for priority communication of BT HV3 traffic when utilizing a predetermined guard time, in accordance with an embodiment of the invention. Referring to FIG. 5A, after start step 502, in step 504, a WLAN radio device, substantially as shown in FIGS. 2A-2D, may be transmitting WLAN packets to an access point. When reception of a transmitted WLAN packet is not acknowledged, the packet may be retransmitted but the retransmission attempt may be backed off by an exponentially growing time. When failure to receive a transmitted WLAN packet results from, for example, interference produced by the collocated Bluetooth radio device, exponentially backing off the next transmission attempt may result in a reduced transmission rate that may result in more interference from the Bluetooth radio device. The Bluetooth radio device may be substantially as shown in FIGS. 2A-2D. Moreover, because of the periodicity of the BT HV3 frame, new transmission attempts may occur at a time when the TX_BT signal is asserted, further delaying the retransmission. These effects may result in a spiraling condition where the retransmission of an unacknowledged WLAN packet may be delayed sufficiently that the access point may consider the station outside its range of operation. In this regard, for coexistence operation of collocated WLAN and Bluetooth radio devices, the exponentially growing retransmission backoff in the WLAN radio device may be disabled.

In step 506, the WLAN radio device may determine whether the Bluetooth radio device has asserted the TX_BT signal. When the TX_BT signal has not been asserted, the WLAN radio device may continue transmitting WLAN packets as in step 504. When the TX_BT signal has been asserted, the WLAN radio device may proceed to step 508. In step 508, the WLAN radio device may complete transmission of a current WLAN packet within the guard time provided by the TX_BT signal before BT HV3 frame transmission is to occur. When the current WLAN packet may not be transmitted within the guard time provided by the TX_BT signal, then the WLAN radio device may terminate transmission of the current WLAN packet and may retransmit the current WLAN packet at the next available WLAN transmission window. In step 510, the WLAN radio device may store information regarding WLAN packet transmission status. For example, the WLAN radio device may store information regarding whether the current WLAN packet was completely transmitted or was terminated and a future transmission attempt is necessary.

In step 512, the WLAN radio device may determine whether the Bluetooth radio device has deasserted the TX_BT signal. When the TX_BT signal has not been deasserted, the Bluetooth radio device may still be transmitting BT HV3 traffic and the WLAN transmission may remain disabled. When the TX_BT signal has been deasserted, the WLAN radio device may proceed to step 514 and resume WLAN packet transmission. In step 514, the WLAN radio device may resume transmission of a terminated current WLAN packet or may transmit a next WLAN packet if the current WLAN packet was transmission was completed previously within the guard time provided by the TX_BT signal. After step 514, the flow diagram 500 may proceed to end step 516.

Figure 5B:
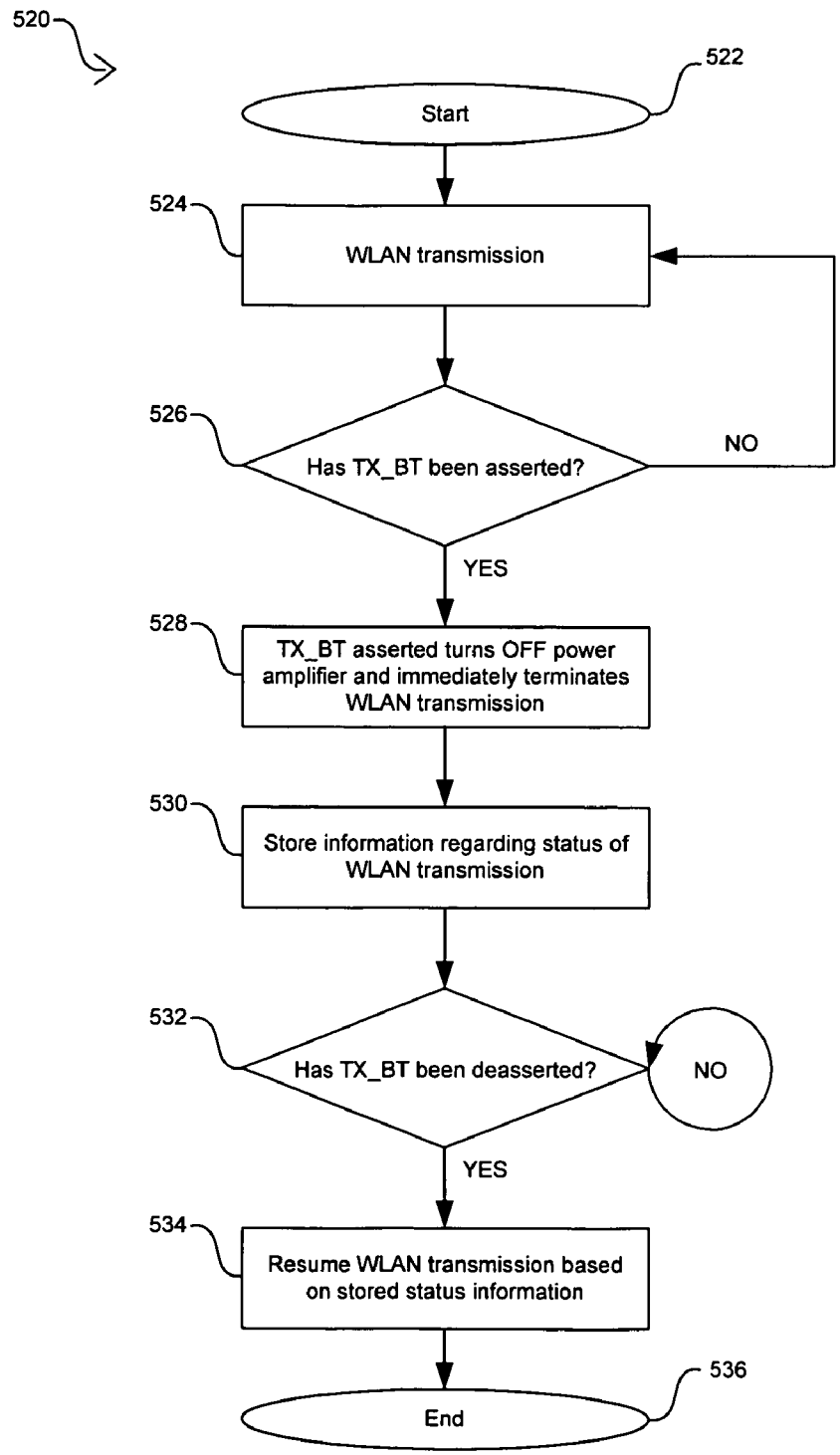
FIG. 5B is a flow diagram that illustrates exemplary steps for priority communication of BT HV3 traffic when the TX_BT signal is utilized to turn OFF a WLAN radio power amplifier, in accordance with an embodiment of the invention.

FIG. 5B is a flow diagram that illustrates exemplary steps for priority communication of BT HV3 traffic when the TX_BT signal is utilized to turn OFF a WLAN radio power amplifier, in accordance with an embodiment of the invention. Referring to FIG. 5B, after start step 522, in step 524, a WLAN radio device, substantially as shown in FIGS. 2A-2D, may be transmitting WLAN packets to an access point. The exponentially growing retransmission backoff in the WLAN radio device may be disabled. In step 526, the WLAN radio device may determine whether a collocated Bluetooth radio device, substantially as shown in FIGS. 2A-2D, has asserted the TX_BT signal. When the TX_BT signal has not been asserted, the WLAN radio device may continue transmitting WLAN packets as in step 524. When the TX_BT signal has been asserted, the WLAN radio device may proceed to step 528. In step 528, the asserted TX_BT signal may turn OFF a power amplifier in the transmission portion of the WLAN radio device immediately terminating the transmission of a current WLAN packet. In step 530, the WLAN radio device may store information regarding, for example, scheduling a next transmission attempt for the current WLAN packet during a next available WLAN transmission window.

In step 532, the WLAN radio device may determine whether the Bluetooth radio device has deasserted the TX_BT signal. When the TX_BT signal has not been deasserted, the Bluetooth radio device may still be transmitting BT HV3 traffic and the WLAN transmission may remain disabled. When the TX_BT signal has been deasserted, the WLAN radio device may proceed to step 534 and resume WLAN packet transmission. In step 34, the WLAN radio device may resume transmission of the terminated current WLAN packet. After step 534, the flow diagram 520 may proceed to end step 536.

Regarding disabling the exponentially growing retransmission backoff, when asserting the TX_BT signal during a station to access point transmission and the WLAN packet transmission is interrupted by turning OFF the WLAN radio amplifier, the WLAN radio device's firmware may be adapted to detect the TX_BT signal in order to update a state machine, for example, not to expect an acknowledgement (ACK) from the access point. Otherwise, the WLAN radio device may not have information indicating that an ACK was not to be received in this instance and, in accordance with the IEEE 802.11b/g specification, the WLAN radio device may exponentially delay each retransmission attempt.

Figure 5C:
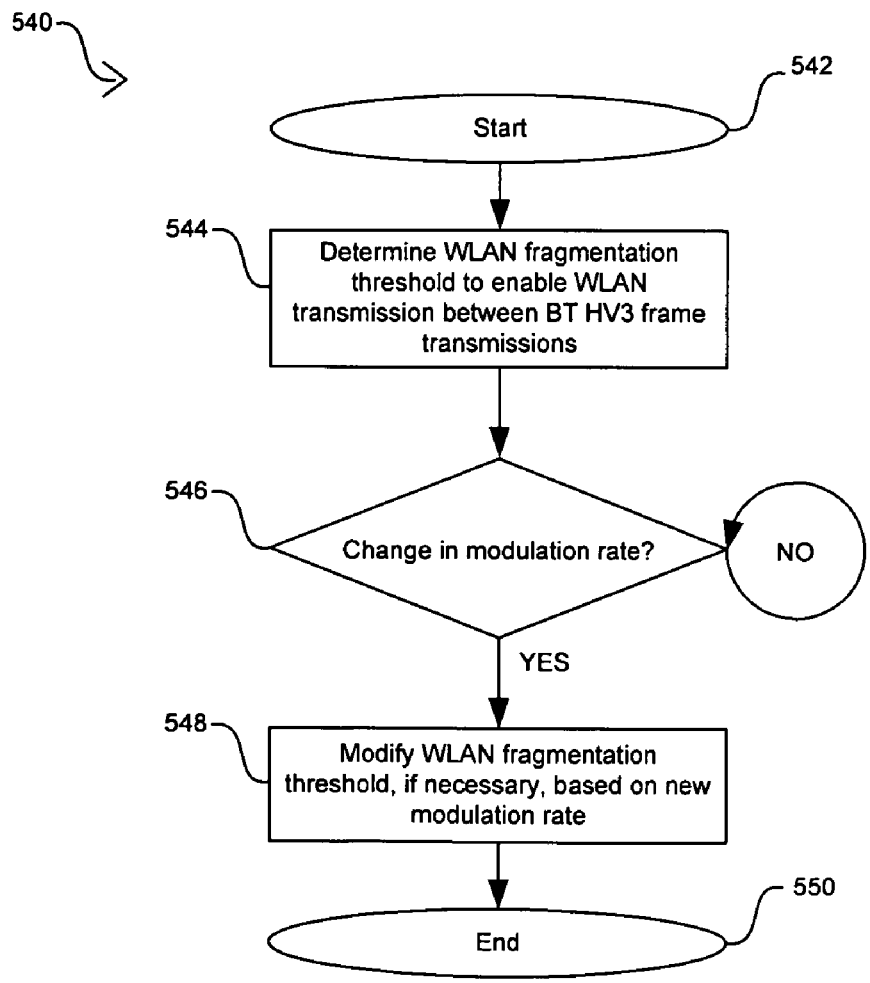
FIG. 5C is a flow diagram that illustrates exemplary steps for modifying a WLAN fragmentation threshold based on a WLAN modulation rate, in accordance with an embodiment of the invention.

FIG. 5C is a flow diagram that illustrates exemplary steps for modifying a WLAN fragmentation threshold based on a WLAN modulation rate, in accordance with an embodiment of the invention. Referring to FIG. 5C, after start step 542, in step 544, the WLAN radio device may determine a packet fragmentation threshold to enable transmission during the WLAN transmission window. A packet for transmission control protocol (TCP) may be approximately 1500 bytes, for example. As shown in FIG. 3, the WLAN transmission window is approximately 2.5 ms in duration. When the fragmentation threshold for WLAN transmission is high, for example, higher than 1500 bytes, then all bytes in the TCP packet payload may be used in the WLAN packet payload. Packets with a higher number of bytes result in more efficient transmission. When the fragmentation threshold for WLAN transmission is low, for example, 256 bytes or lower, then several WLAN packets may be necessary to transmit the TCP payload. While fewer bytes in a WLAN packet is less efficient, when collisions occur, it may be more efficient to retransmit shorter WLAN packets.

In order to guarantee that the WLAN packet is transmitted within the 2.5 ms window, a WLAN radio device, substantially as shown in FIGS. 2A-2D, may select the fragmentation threshold based on the modulation rate of the WLAN link. For example, when the fragmentation threshold is 256 bytes, a 2 Mbps modulation rate will produce a WLAN packet of approximately 1 ms, which is well within the WLAN transmission window between BT HV3 packet traffic. On the other hand, when the fragmentation threshold is 1500 bytes, a 2 Mbps modulation rate will produce a WLAN packet of approximately 6 ms, which will not be completely transmitted within the WLAN transmission window.

After step 544, a WLAN radio device may determine whether the modulation rate in the WLAN link has changed. When the modulation rate has not changed, the current fragmentation threshold still provides for WLAN packet transmission within the WLAN transmission window. When the modulation rate in the WLAN link has changed, the WLAN radio device may proceed to step 548. In step 548, the WLAN radio device may modify the fragmentation threshold, if necessary, to guarantee that a WLAN packet may be completely transmitted within the WLAN transmission window. After step 548, the flow diagram 540 may proceed to end step 550.

The invention provides a simple collaborative approach between collocated WLAN and Bluetooth radio devices in a coexistent terminal that achieves enhanced quality and higher throughput for IEEE 802.11b/g and Bluetooth communication. This approach may be applicable to a mobile station that handles at least a first communication protocol and a second communication protocol, where the first communication protocol may assert a priority signal to disable the capabilities of the second communication protocol. The capabilities of the second communication protocol may include, for example, transmitting and receiving information. In this regard, data for the first communication protocol may be transmitted when the second communication protocol capabilities are disabled. Disabling the capabilities of the second communication protocol may be include, for example, turning OFF a transceiver or a power amplifier.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:
in a station that handles at least a Bluetooth (BT) communication protocol and a Wireless Local Area Network (WLAN) communication protocol:
asserting a BT priority signal for enabling transmission of Bluetooth protocol data, said asserting occurring within a guard time prior to said Bluetooth protocol data being transmitted;
adjusting WLAN transmission capabilities based on said asserted BT priority signal, wherein said adjusting comprises reducing a transmit power of said WLAN transmission capabilities;
storing status information of a WLAN packet scheduled to be transmitted during said guard time, said status information indicating whether transmission of said WLAN packet occurred before the end of said guard time; and
transmitting said Bluetooth protocol data subsequent to said adjusting of said WLAN transmission capabilities.

2. The method according to claim 1, comprising deasserting said BT priority signal subsequent to completion of said transmission of said Bluetooth protocol data.

3. The method according to claim 2, comprising reducing said transmit power of said WLAN transmission capabilities concurrently with a reduction in a transmit power corresponding to said transmitting of Bluetooth protocol data.

4. The method according to claim 1, comprising disabling retransmission backoff in said WLAN communication protocol subsequent to said assertion of said BT priority signal.

5. The method according to claim 1, comprising resuming WLAN transmission based on said stored status information.

6. The method according to claim 1, wherein said stored status information comprises a scheduled next transmission attempt during a next available WLAN transmission window for a WLAN packet transmission terminated before completion.

7. A system for providing wireless communication, the system comprising:
- a station that comprises a Bluetooth (BT) radio that handles a BT communication protocol and a Wireless Local Area Network (WLAN) radio that handles a WLAN communication protocol, wherein:
- said BT radio is operable to assert a BT priority signal for enabling transmission of Bluetooth protocol data, said assertion occurring within a guard time prior to said Bluetooth protocol data being transmitted;
- said WLAN radio is operable to adjust WLAN transmission capabilities based on said asserted BT priority signal, wherein said adjustment comprises reducing a transmit power of said WLAN transmission capabilities;
- said WLAN radio is operable to store status information of a WLAN packet scheduled to be transmitted during said guard time, said status information indicating whether transmission of said WLAN packet occurred before the end of said guard time;
- said BT radio is operable to transmit said Bluetooth protocol data subsequent to said adjustment of said WLAN transmission capabilities.

8. The system according to claim 7, wherein said BT radio is operable to deassert said BT priority signal subsequent to completion of said transmission of said Bluetooth protocol data.

9. The system according to claim 8, wherein said WLAN radio is operable to reduce said transmit power of said WLAN transmission capabilities concurrently with a reduction in a transmit power corresponding to said transmitting of Bluetooth protocol data.

10. The system according to claim 7, wherein said WLAN radio is operable to disable retransmission backoff in said WLAN communication protocol subsequent to said assertion of said BT priority signal.

11. The system according to claim 7, wherein said BT radio is operable to resume said WLAN transmission based on said stored status information.

12. The system according to claim 7, wherein said stored status information comprises a scheduled next transmission attempt during a next available WLAN transmission window for a WLAN packet transmission terminated before completion.

13. A non-transitory machine-readable storage having stored thereon, a computer program having at least one code section for providing wireless communication, the at least one code section being executable by a machine for causing the machine to perform steps comprising:
- in a station that handles at least a Bluetooth (BT) communication protocol and a Wireless Local Area Network (WLAN) communication protocol:
- asserting a BT priority signal for enabling transmission of Bluetooth protocol data, said asserting occurring within a guard time prior to said Bluetooth protocol data being transmitted;
- adjusting WLAN transmission capabilities based on said asserted BT priority signal, wherein said adjusting comprises reducing a transmit power of said WLAN transmission capabilities;
- storing status information of a WLAN packet scheduled to be transmitted during said guard time, said status information indicating whether transmission of said WLAN packet occurred before the end of said guard time;
- transmitting said Bluetooth protocol data subsequent to said adjusting of said WLAN transmission capabilities.

14. The non-transitory machine-readable storage according to claim 13, wherein said at least one code section comprises code for deasserting said BT priority signal subsequent to completion of said transmission of said Bluetooth protocol data.

15. The non-transitory machine-readable storage according to claim 14, wherein said at least one code section comprises code for reducing said transmit power of said WLAN transmission capabilities concurrently with a reduction in a transmit power corresponding to said transmitting of Bluetooth protocol data.

16. The non-transitory machine-readable storage according to claim 13, wherein said at least one code section comprises code for disabling retransmission backoff in said WLAN communication protocol subsequent to said assertion of said BT priority signal.

17. The non-transitory machine-readable storage according to claim 13, wherein said at least one code section comprises code for resuming WLAN transmission based on said stored status information.

18. The non-transitory machine-readable storage according to claim 13, wherein said stored status information comprises a scheduled next transmission attempt during a next available WLAN transmission window for a WLAN packet transmission terminated before completion.

19. A system for providing wireless communication, the system comprising:
- one or more circuits for use in a station, said one or more circuits operable to handle a Bluetooth (BT) communication protocol and a Wireless Local Area Network (WLAN) communication protocol, wherein:
- said one or more circuits are operable to assert a BT priority signal for enabling transmission of Bluetooth protocol data, said assertion occurring within a guard time prior to said Bluetooth protocol data being transmitted;
- said one or more circuits are operable to adjust WLAN transmission capabilities based on said asserted BT priority signal, wherein said adjustment comprises reducing a transmit power of said WLAN transmission capabilities;
- said one or more circuits are operable to store status information of a WLAN packet scheduled to be transmitted during said guard time, said status information indicating whether transmission of said WLAN packet occurred before the end of said guard time;
- said one or more circuits are operable to transmit said Bluetooth protocol data subsequent to said adjustment of said WLAN transmission capabilities.

20. The system according to claim 19, wherein said one or more circuits are operable to deassert said BT priority signal subsequent to completion of said transmission of said Bluetooth protocol data.

21. The system according to claim 20, wherein said one or more circuits are operable to reduce said transmit power of said WLAN transmission capabilities concurrently with a reduction in a transmit power corresponding to said transmitting of Bluetooth protocol data.

22. The system according to claim 19, wherein said one or more circuits are operable to disable retransmission backoff in said WLAN communication protocol subsequent to said assertion of said BT priority signal.

23. The system according to claim 19, wherein said one or more circuits are operable to resume said WLAN transmission based on said stored status information.

24. The system according to claim 19, wherein said stored status information comprises a scheduled next transmission attempt during a next available WLAN transmission window for a WLAN packet transmission terminated before completion.

25. A method for providing wireless communication, the method comprising:
   in a station that handles at least a Bluetooth (BT) communication protocol and a Wireless Local Area Network (WLAN) communication protocol:
      asserting a BT priority signal for enabling transmission of Bluetooth protocol data, said asserting occurring within a guard time prior to said Bluetooth protocol data being transmitted;
      adjusting WLAN transmission capabilities based on said asserted BT priority signal, wherein said adjusting comprises reducing a transmit power of said WLAN transmission capabilities;
      storing status information of a WLAN packet scheduled to be transmitted during said guard time, said status information indicating whether transmission of said WLAN packet occurred before the end of said guard time;
      transmitting said Bluetooth protocol data subsequent to said adjusting of said WLAN transmission capabilities; and
      disabling a retransmission backoff in said WLAN communication protocol subsequent to said assertion of said BT priority signal.

26. The method according to claim 25, wherein said retransmission backoff grows exponentially.

27. The method according to claim 25, comprising deasserting said BT priority signal subsequent to completion of said transmission of said Bluetooth protocol data.

28. The method according to claim 25, comprising reducing said transmit power of said WLAN transmission capabilities concurrently with a reduction in a transmit power corresponding to said transmitting of Bluetooth protocol data.

29. The method according to claim 25, comprising turning OFF a power amplifier subsequent to said adjusting of said WLAN transmission capabilities.

30. The method according to claim 25, comprising resuming WLAN transmission based on said stored status information.

31. A system for providing wireless communication, the system comprising:
   a station that comprises a Bluetooth (BT) radio that handles a BT communication protocol and a Wireless Local Area Network (WLAN) radio that handles a WLAN communication protocol, wherein:
      said BT radio is operable to assert a BT priority signal for enabling transmission of Bluetooth protocol data, said assertion occurring within a guard time prior to said Bluetooth protocol data being transmitted;
      said WLAN radio is operable to adjust WLAN transmission capabilities based on said asserted BT priority signal, wherein said adjustment comprises reducing a transmit power of said WLAN transmission capabilities;
      said WLAN radio is operable to store status information of a WLAN packet scheduled to be transmitted during said guard time, said status information indicating whether transmission of said WLAN packet occurred before the end of said guard time;
      said BT radio is operable to transmit said Bluetooth protocol data subsequent to said adjustment of said WLAN transmission capabilities; and
      said BT radio is operable to disable a retransmission backoff in said WLAN communication protocol subsequent to said assertion of said BT priority signal.

32. The system according to claim 31, wherein said retransmission backoff grows exponentially.

33. The system according to claim 31, wherein said BT radio is operable to deassert said BT priority signal subsequent to completion of said transmission of said Bluetooth protocol data.

34. The system according to claim 33, wherein said WLAN radio is operable to reduce said transmit power of said WLAN transmission capabilities concurrently with a reduction in a transmit power corresponding to said transmitting of Bluetooth protocol data.

35. The system according to claim 31, wherein said BT radio is operable to turn OFF a power amplifier subsequent to said adjustment of said WLAN transmission capabilities.

36. The system according to claim 31, wherein said BT radio is operable to resume said WLAN transmission based on said stored status information.

37. A non-transitory machine-readable storage having stored thereon, a computer program having at least one code section for providing wireless communication, the at least one code section being executable by a machine for causing the machine to perform steps comprising:
   in a station that handles at least a Bluetooth (BT) communication protocol and Wireless Local Area Network (WLAN) communication protocol:
      asserting a BT priority signal for enabling transmission of Bluetooth protocol data, said asserting occurring within a guard time prior to said Bluetooth protocol data being transmitted;
      adjusting WLAN transmission capabilities based on said asserted BT priority signal, wherein the adjusting comprises reducing a transmit power of said WLAN transmission capabilities;
      storing status information of a WLAN packet scheduled to be transmitted during said guard time, said status information indicating whether transmission of said WLAN packet occurred before the end of said guard time;
      transmitting said Bluetooth protocol data subsequent to said adjusting of said WLAN transmission capabilities; and
      disabling a retransmission backoff in said WLAN communication protocol subsequent to said assertion of said BT priority signal.

38. The non-transitory machine-readable storage according to claim 37, wherein said retransmission backoff grows exponentially.

39. The non-transitory machine-readable storage according to claim 37, wherein said at least one code section comprises code for deasserting said BT priority signal subsequent to completion of said transmission of said Bluetooth protocol data.

40. The non-transitory machine-readable storage according to claim 39, wherein said at least one code section comprises code for reducing said transmit power of said WLAN transmission concurrently with a reduction of a transmit power corresponding to said transmitting of Bluetooth protocol data.

41. The non-transitory machine-readable storage according to claim 37, wherein said at least one code section comprises code for turning OFF a power amplifier subsequent to said adjusting of said WLAN transmission capabilities.

42. The non-transitory machine-readable storage according to claim 37, wherein said at least one code section comprises code for resuming WLAN transmission based on said stored status information.

43. A system for providing wireless communication, the system comprising:
   one or more circuits for use in a station, said one or more circuits operable to handle a Bluetooth (BT) communication protocol and a Wireless Local Area Network (WLAN) communication protocol, wherein:
said one or more circuits are operable to assert a BT priority signal for enabling transmission of Bluetooth protocol data, said assertion occurring within a guard time prior to said Bluetooth protocol data being transmitted;
said one or more circuits are operable to adjust WLAN transmission capabilities based on said asserted BT priority signal, wherein said adjustment comprises reducing a transmit power of said WLAN transmission capabilities;
said one or more circuits are operable to store status information of a WLAN packet scheduled to be transmitted during said guard time, said status information indicating whether transmission of said WLAN packet occurred before the end of said guard time;
said one or more circuits are operable to transmit said Bluetooth protocol data subsequent to said adjustment of said WLAN transmission capabilities; and
said one or more circuits are operable to disable a retransmission backoff in said WLAN communication protocol subsequent to said assertion of said BT priority signal.

44. The system according to claim 43, wherein said retransmission backoff grows exponentially.

45. The system according to claim 43, wherein said one or more circuits are operable to deassert said BT priority signal subsequent to completion of said transmission of said Bluetooth protocol data.

46. The system according to claim 45, wherein said one or more circuits are operable to reduce said transmit power of said WLAN transmission capabilities concurrently with a reduction in a transmit power corresponding to said transmitting of Bluetooth protocol data.

47. The system according to claim 43, wherein said one or more circuits are operable to turn OFF a power amplifier subsequent to said adjustment of said WLAN transmission capabilities.

48. The system according to claim 41, wherein said one or more circuits are operable to resume said WLAN transmission based on said stored status information.

* * * * *